(12) United States Patent
Devige et al.

(10) Patent No.: US 6,933,930 B2
(45) Date of Patent: Aug. 23, 2005

(54) ACCURATE INTERACTIVE ACOUSTIC PLATE

(76) Inventors: Fabrice Devige, 120 avenue Victor Hugo, 92170 Vanves (FR); Jean-Pierre Nikolovski, 12-14, rue Piccini, 75116 Paris (FR)

( * ) Notice: Subject to any disclaimer, the term of this patent is extended or adjusted under 35 U.S.C. 154(b) by 308 days.

(21) Appl. No.: 10/070,333

(22) PCT Filed: Jun. 29, 2001

(86) PCT No.: PCT/FR01/02088

§ 371 (c)(1),
(2), (4) Date: Jun. 11, 2002

(87) PCT Pub. No.: WO02/01490

PCT Pub. Date: Jan. 3, 2002

(65) Prior Publication Data

US 2003/0066692 A1 Apr. 10, 2003

(30) Foreign Application Priority Data

Jun. 29, 2000 (FR) .......................................... 00 08372

(51) Int. Cl.⁷ .............................................. G09G 5/00
(52) U.S. Cl. .................................... 345/173; 178/18.04
(58) Field of Search ................................ 345/173, 177; 178/18.01, 18.04, 20.01, 20.03, 20.04

(56) References Cited

U.S. PATENT DOCUMENTS

| | | | | |
|---|---|---|---|---|
| 5,854,450 A | * | 12/1998 | Kent | 178/18.04 |
| 6,593,917 B2 | * | 7/2003 | Toda | 345/173 |
| 6,630,929 B1 | * | 10/2003 | Adler et al. | 345/177 |
| 6,633,280 B1 | * | 10/2003 | Matsumoto et al. | 345/173 |
| 6,750,853 B2 | * | 6/2004 | Takahashi et al. | 345/177 |

FOREIGN PATENT DOCUMENTS

FR       2787608       6/2000

* cited by examiner

*Primary Examiner*—Kent Chang
(74) *Attorney, Agent, or Firm*—Blakely Sokoloff Taylor & Zafman

(57) ABSTRACT

A device for acquiring the position co-ordinates of a source of mechanical waves optionally generated by impacting the surface of a plate (PLQ) of finite dimensions. A set of acoustic sensors (PZT00 to PZT11) each formed by a pair of piezoelectric transducers (PZTa, PZTb) face each other on either side of the plate, the device includes a processor for determining the co-ordinates of the source by analyzing the difference in propagation time of the acoustic waves generated by the source to the different sensors. The processor combined with each sensor (PZT00 to PZT 11) a respective electronic circuit includes a digitized mounted in cascade for digitizing the amplified signal around a predetermined frequency, associated with a mechanism for limiting the digitization to a time window starting before the acoustic waves reach a sensor and ending when the acoustic waves have reached said sensor.

31 Claims, 9 Drawing Sheets

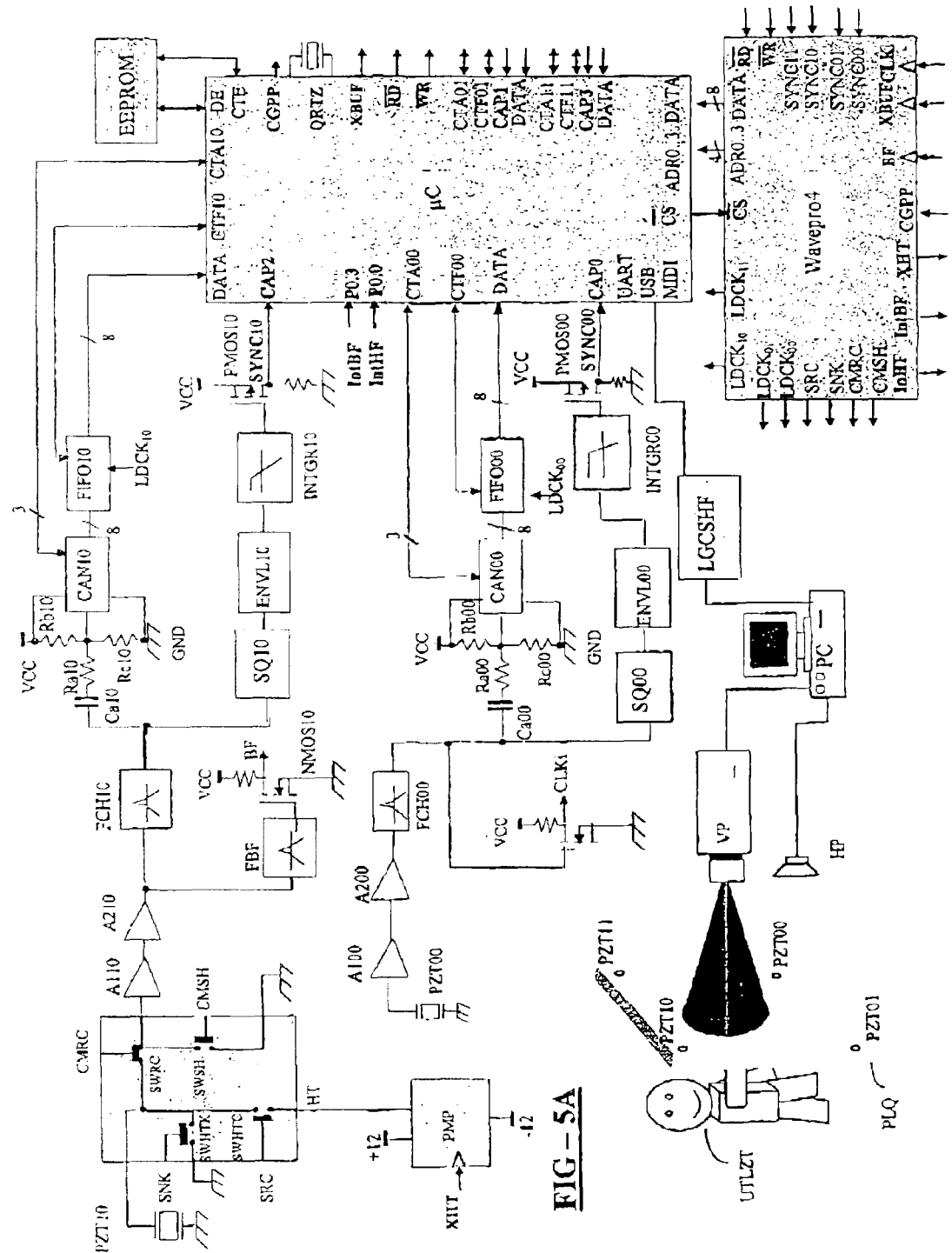
FIG—5A

ACCURATE INTERACTIVE ACOUSTIC PLATE

The present invention deals generally with devices for interactive communication between a user and a machine. More precisely, the invention relates to a device for gathering and for processing acoustic waves transmitted by a user or a sensor to a plate serving as interface with a machine, said device analyzing the propagation times of the acoustic waves in the plate so as in particular to measure the coordinates $x_r$, $y_r$ of impacts on the surface of the plate.

Patent WO96/11378 discloses a device for acquiring coordinates $x_r$, $y_r$ of that point of a rigid plate from which a source emits, pointwise, wave packets, by analyzing the propagation time of the waves in the plate in two directions x and y of the plate.

Also, French patent 9816229 of 22 Dec. 1998 discloses an acquisition device where two pairs of transducers are respectively associated with each direction x, y, the position of the source along each direction being determined by measuring the differential of the arrival times at which the wave packets reach the two respective pairs of transducers of said direction.

These two acquisition devices are especially well adapted to the selective detection of an acoustic Lamb mode in an isotropic glass plate. In particular, the device of patent 9816229 proposes a process for quantizing the intensity of an impact enabling it to attain an accuracy of 1% in the position measurement. The present invention shows how to further improve this result, this turning out to be necessary if one wishes to be able to point reliably at zones of the size of a square centimeter on a plate of four to ten square meters. Furthermore, the devices described in the abovecited patents are rather unreliable when the plate is a laminated glass, that is to say is an assemblage of two or more single-strength or annealed or tempered sheets of glass, intimately stuck together by interposition of one or more polymer films such as polyvinyl butyral. For safety reasons, the use of laminated glasses is a condition which is ever more frequently demanded in the public arena. In case of breakage, the polymer constitutes a reinforcement to which the glass splinters remain stuck, thus enabling the laminated glass to ensure residual protection before replacement.

The use of laminated glass for producing acoustic panes operating on the principle of the locating of impacts by measuring the propagation time of ultrasound plate modes requires an improvement to the devices described in the above patents.

The aim of the present invention is thus to improve the quality and the reliability of reception of acoustic waves in a device adapted both to isotropic single-strength or laminated plates. In particular, the invention will show how to improve the accuracy of measurement by making the latter yet more independent of the intensity of the shock.

Another aim of the present invention is also to improve the ergonomics of the device in particular through automated calibration of the plate making it possible to allow for the effects of temperature on the velocity of propagation of the acoustic waves and hence on the accuracy as well as through the establishing of a simpler and faster homothetic correspondence between the real coordinates of an impact on the plate and the screen coordinates of a graphical interface projected directly onto the plate with the aid of a video projector, it being possible for the size of said graphical interface to vary rapidly as a function of a desired or accidental movement of the video projector.

The invention is also concerned with improving the communication means made available to the user in order to emulate according to the principle of activation by an impact, the manner of operation of a pointer of mouse type or of an alphanumeric keyboard required for searching for information on the Internet.

The invention shows finally how to mask the noise of impacts on the glazing through a process of superimposing a synthesized sound on the sound emanating from an impact.

To achieve these aims, the invention proposes a device for acquiring coordinates of points of interaction of an acoustic source with the surface of the plate, optionally laminated, of finite dimensions comprising a set of acoustic sensors each formed of a pair of piezoelectric transducers situated facing one another on either side of the plate, the device comprising processing means for determining the coordinates of said point of interaction by analyzing the difference in propagation times of the acoustic waves emitted by the source to the various sensors, a device characterized in that the processing means comprise in association with each sensor a respective electronic circuit comprising in cascade, means for performing a broadband preamplification, means of selective amplification centered on a first specified frequency, means for detecting the head of the wave packet and for sampling the signal over a time window encompassing the head of the wave packet as well as means for switching the sensors to emitter or to receiver so as to determine the velocity of propagation of the ultrasound waves or else to carry out an integrity check on the plate, as well as means for calibrating the acquisition system in an automated manner which is therefore simple for the user.

Preferred but nonlimiting aspects of the device according to the invention are the following:

- the sensors are four in number and the piezoelectric transducers of each sensor are disks of piezoelectric ceramics stuck to either side of the plate, in such a way that four sensors form the vertices of a rectangle whose center constitutes the origin of the coordinates,
- the rectangle defined by the sensors is divided into four quadrants, each quadrant being associated with a trio of sensors which are closest to the center of the quadrant responsible for detecting the coordinates of an impact in this quadrant with a better measurement accuracy than that which would be obtained with the other trios,
- the piezoelectric ceramic disks have a silver-plated lapover enabling the electrical connections to be made on the same face of the disk,
- the piezoelectric ceramics are of ferroelectric type,
- the silver-plated lapover is preferably cylindrically symmetric. When the silver-plated lapover is not cylindrically symmetric, it is positioned in such a way that the sensor has the most omnidirectional possible sensitivity,
- the electrical connections of the two piezoelectric transducers of each sensor are linked in parallel, the polarization vectors being arranged symmetrically with respect to the midplane of the plate in such a way that the slower antisymmetric modes are discouraged and the faster symmetric modes are favored,
- the locating of a point of impact with a laminated glass consisting of an assemblage of two identical plates, each of thickness e, bonded together by a polymer film, consists in extracting the ultrasound frequency component fc satisfying the rule: $f_c.e=1.2$ MHz.mm, said frequency being generated by the impact of a hard object such as the flat of a fingernail, a metal key, a hard plastic rod, the locating of a point of impact on a plate in one of the four quadrants defined by the pair of bits ($g_y$, $g_x$) consists in measuring the difference in flight times between two sensors, taken from among a trio of sensors, defining a first direction and two sensors, taken from among the same trio of sensors, defining a second direction perpendicular to the first, so that the cartesian coordinates of the point of impact ($x_r$, $y_r$) on the plate are given by the formula:

$$X_r = (-1)^{g_x} \frac{\Delta t x g \left\{ q \sqrt{p^2 v^2 (4p^2 - v^2 \Delta t x g^2)(4p^2 + 4q^2 - v^2(\Delta t x g - \Delta t y g)^2) \Delta t y g^2 (4q^2 - v^2 \Delta t y g^2)} \right\}}{4 p \Delta t y g (q^2 v^2 \Delta t x g^2 + p^2 (-4q^2 + v^2 \Delta t y g^2))} +$$

$$(-1)^{g_x} \frac{\Delta t x g \, p^2 v^2 \Delta t y g^2 (-4q^2 + v^2 \Delta t y g (-\Delta t x g + \Delta t y g))}{4 p \Delta t y g (q^2 v^2 \Delta t x g^2 + p^2 (-4q^2 + v^2 \Delta t y g^2))}$$

$$Y_r = (-1)^{g_y} \frac{q v^2 \Delta t x g (-4p^2 + v^2 \Delta t x g (\Delta t x g - \Delta t y g)) \Delta t y g}{4(q^2 v^2 \Delta t x g^2 + p^2 (-4q^2 + v^2 \ddot{A} t y g^2))} +$$

$$(-1)^{g_y} \frac{\sqrt{p^2 v^2 (4p^2 - v^2 \Delta t x g^2)(4p^2 + 4q^2 - v^2(\Delta t x g - \Delta t y g)^2) \Delta t y g^2 (4q^2 - v^2 \Delta t y g^2)}}{4(q^2 v^2 \Delta t x g^2 + p^2 (-4q^2 + v^2 \ddot{A} t y g^2))}$$

where p and q are positive numbers respectively representing the abscissa and the ordinate of the position of the sensors with respect to the center of the rectangle defined by the sensors, the speed of the plate mode detected, that is to say, for a laminated glass, that of the fastest mode, $\Delta t_{xg}$, (respectively $\Delta t_{yg}$) the difference in the propagation times of the wave packet generated by the impact between the sensors of the first pair situated in the half-rectangle $g_x$ (respectively of the second pair situated in the half-rectangle $g_y$), the determination of the trio of sensors associated with a given impact is performed according to an algorithm which searches for the largest difference in flight times available between the sensors in two perpendicular directions, said electronic circuits associated with the sensors comprise in cascade a broadband preamplifier stage, an amplifier stage selective in the ultrasound band, a squaring stage, a peak detector stage, an integrator stage, a stage for adaptation to a logic level constituting a synchronizing signal "SYNC" intended on the one hand for the approximate calculation of the position of an impact, on the other hand to order the stoppage of the digital recording of the signal associated with the sensor, on the other hand for the starting of the sound enrichment procedure described hereinbelow, the electronic circuits associated with the respective sensors comprise downstream of said means of selective amplification, synchronous analog digital converters associated with FIFO (first in-first out) memories of sufficient depth to digitize the equivalent of several acoustic periods of the selected frequency, in such a way as to furnish a digital recording starting before the arrival of the head of the wave packet, said digitization of the signal being characterized by a sampling frequency of at least 1 MHz, the difference in flight times between the sensors is deduced, on the one hand, from the time intervals between the synchronization signals, on the other hand, from the time intervals separating the synchronization signals from the heads of the wave packets, the electronic circuits associated with the respective sensors comprise upstream of said means of selective amplification a bypass to means of digitization, analysis and frequency enrichment of the audible acoustic signal generated by the impact on the plate, as well as means for reconverting the enriched digital signal into an analog signal and sending it to loudspeakers so as to mask the nuisance caused by the impact in the form of a more pleasant sound reproducing for example the noise of a percussion instrument within a symphonic composition, or the noise of an animal or of a natural event, said means of enrichment being implemented at the very instant at which the first of the four synchronization signals is activated, the measurement of the time interval separating a synchronization signal from the head of the associated wave packet consists in determining the instants of zero-crossing of the digitized signal by backtracking in time from the instant of switching defined by SYNC, while a test on the sum of the amplitudes between the zero-crossings, that is to say a test on the mean value of the signal per half-period, makes a decision regarding the continuation of the algorithm. When the mean value over a half-period is equal to the output value from the sampler in the absence of any signal, to within a threshold discrepancy, the algorithm is stopped, and the mean value is regarded as being the origin instant $t_{HD}$ of the packet, one at least of the sensors is able to be switched into an emitter of an ultrasound wave packet detected by the other sensors whose positions are known so as, on the one hand, to measure in an automated manner the temperature-dependent velocity of propagation of the ultrasounds, on the other hand, to trigger an integrity test on the plate, by measuring the difference in propagation times of the wave packet between the various sensors, the management of all the steps of measurement, processing and transfer of the data by a serial communication interface, either with an LCD display, or with an interface for musical instruments (MIDI interface), or with a more powerful computer such as a microcomputer via its RS232 or USB port is supervised by a microcontroller, the device constitutes a peripheral interface with a machine which receives the signals emanating from the processing means and which as a function of said signals orders the execution of files contained in the computer by various peripherals of known types linked to the computer, such as for example in a nonlimiting manner a video projector, light sources, loudspeakers, a printer, or else automatic tackle controlling a mechanical action such as the closing of a protective curtain, the system is furnished with software means for emulating the manner of operation of another peripheral such as a pointer of mouse type, or a keyboard and constitutes a peripheral interface with computer which as a function of the signals emanating from the processing means orders the execution of files contained in the computer or, via a modem or a network card, the execution of files contained remotely on a server, the computer is associated with a flat screen of large dimensions or, better still, with a computerized video projector which projects onto a portion referred to as the screen zone of the surface of the plate, at least one of whose faces is made of frosted glass, the information available from an Internet portal, the frosting of the surface can be replaced by the laying of a scattering film, possibly in combination with a Fresnel lens playing the role of directional spyglass, that is to say of directional concentrator of light enabling the graphical interface to be used even in full daylight, the device is furnished with software means making it possible to depict, reduce or move a keyboard on the screen zone, the device is furnished with software means allowing fast and simplified automated establishment of a homothetic correspondence between the real physical coordinates in millimeters of an impact and the graphical coordinates in pixels of this impact when it is produced inside the graphical zone. The axes of the graphical and real coordinate systems are parallel and said software means involve the following operations:

displaying by the software of a target at various positions with known graphical coordinates and measuring of the corresponding real coordinates. For example, a first target is displayed at $N_0(i, j)$ where i and j are screen coordinates, ready of the screen origin. This target is displayed on the acoustic plate at the real coordinates $N_0(x_a, y_c)$. An impact carried out at the place where the target appears makes it possible to gather these real coordinates via the acquisition card. A second target with screen coordinates $N_1(k, l)$ is then displayed ready of the maximum coordinates of the screen. The corresponding real coordinates $N_1(x_b, y_d)$ are obtained through an impact opposite the target.

the graphical coordinates $(N_{qx}, N_{qy})$ of any point Q with real coordinates $(x_r, y_r)$ may then be deduced from the formula:

$$\begin{cases} N_{qx} = i + (k-i)\frac{(x_r - x_a)}{(x_b - x_a)} \\ N_{qy} = j + (l-j)\frac{(y_r - y_d)}{(y_c - y_d)} \end{cases}$$

a reference target is displayed a last time at the center of the graphical screen. The impact carried out opposite the target is converted into screen coordinates according to the above formula. The calculated position is compared with the reference position. If the discrepancy is below a certain threshold, the calibration operation is validated. Otherwise it is repeated.

the device is furnished with software means such that the portion of the plate which does not serve as a screen is nevertheless interactive and is configured as an extension of the screen zone, in particular an impact produced to the left (respectively, to the right, above, below) of the screen zone moves the content of the screen toward the right (respectively to the left, below, above), thus making it possible to read a document of much greater size than the size of the screen zone.

the device is furnished with software means such that the portion of the plate which serves as a screen is regarded as a special zone making it possible to quit or to switch from any software application managing the execution of groups of programs associated with various zones of the plate which are situated off-screen.

conversely, the system is furnished with software means such that any impact produced on the plate outside the screen zone is associated with the execution of a chosen application managing the workspace situated off-screen, such as for example the application where, on the basis of the homothetic correspondence established between the pixels of a digital photograph of the acoustic plate and the physical coordinates of these pixels on the acoustic plate, groups of programs are executed following an impact on a given zone of the plate.

Other aspects aim and advantages of the present invention will become more apparent on reading the following detailed description of preferred embodiments thereof, given by way of nonlimiting example and made with reference to the appended drawings in which:

FIG. 1 is a diagrammatic view of a rectangular plate giving the location and the coordinates of the sensors, the real and graphical reference frames defined, as well as the real and graphical coordinates of three impacts on the plate.

FIG. 2-a is a screen capture of a dialog window making it possible to configure the graphical interface and to define the authorized zone in which the impacts are interpreted as events of a pointer of mouse type.

FIGS. 2-b to 2-f are screen captures of the process for calibrating the graphical interface making it possible to establish the homothetic correspondence between the physical coordinates and the screen coordinates of the portion of the plate playing the role of screen.

FIG. 5a is a block diagram of the general architecture of the acquisition card designed on the basis of analog and digital circuits with, in particular, the use of a microcontroller capable of carrying out the processing of the data for the calculation of the instant of arrival of the wave packet and the transferring of the data by a serial communication protocol to a microcomputer or another device.

Figure 5B:
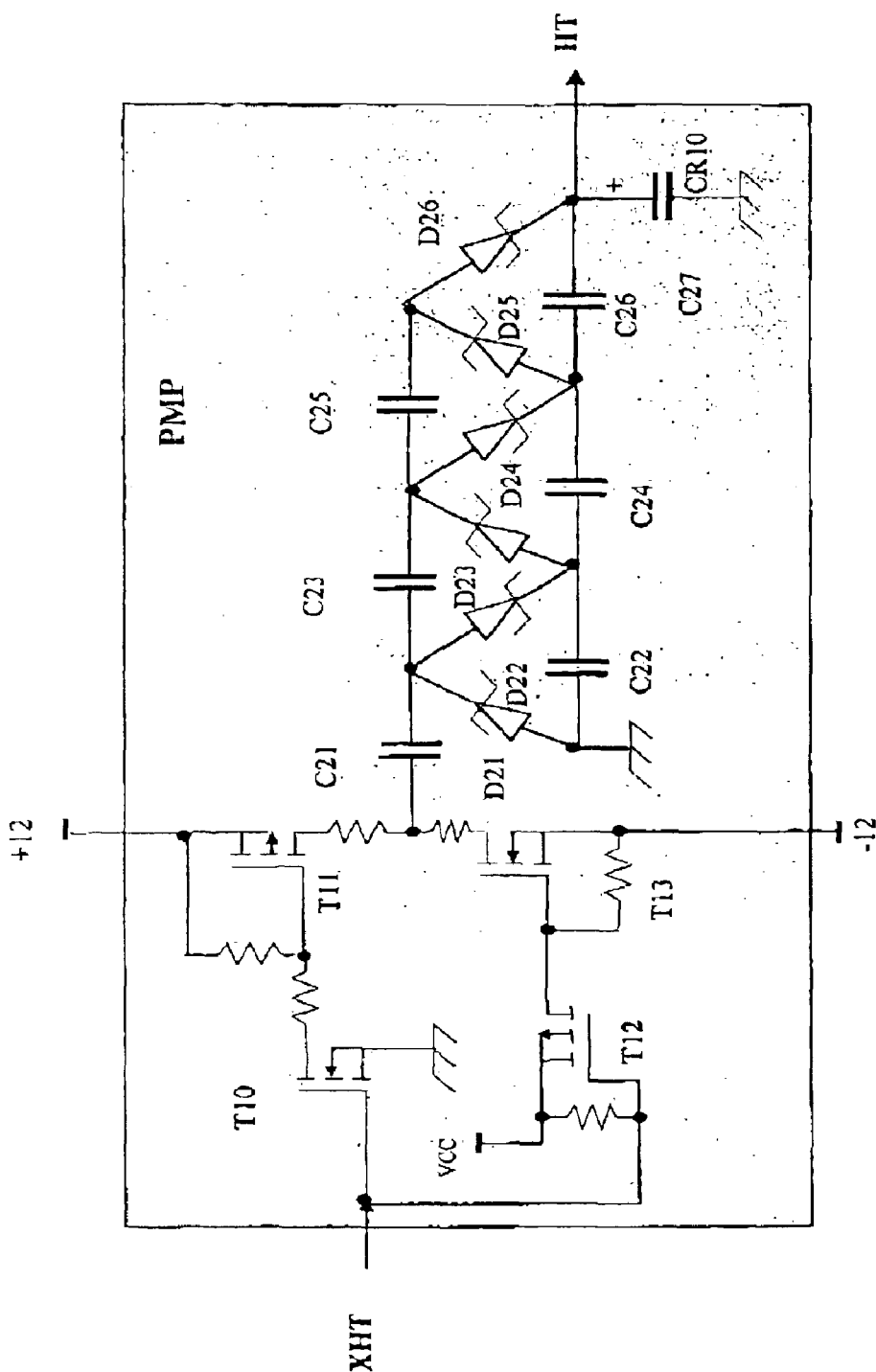

FIG. 5b is a circuit diagram of the PMP module of FIG. 5a and representing a generator delivering a high voltage HT using a diode pump, synchronous with the microcontroller's system clock.

Figure 6:
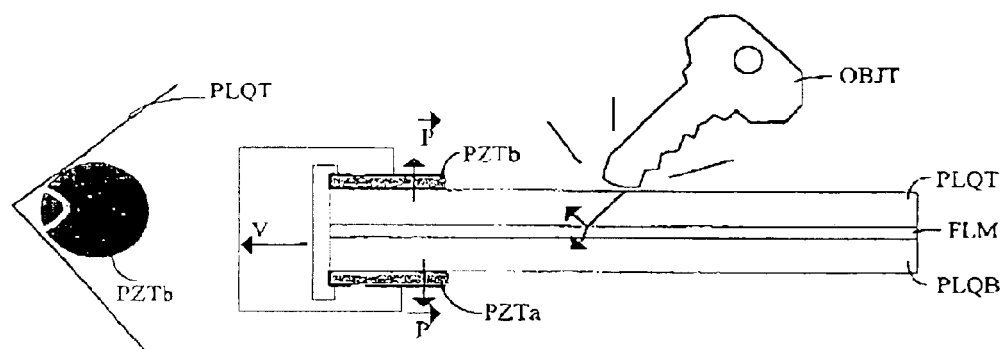

FIG. 6 is a diagrammatic sectional view of the symmetric arrangement of the piezoelectric transducers of a sensor intended for detecting the mode $S_0$ corresponding to the fastest vibrations propagating in a laminated glass.

Figure 7A:
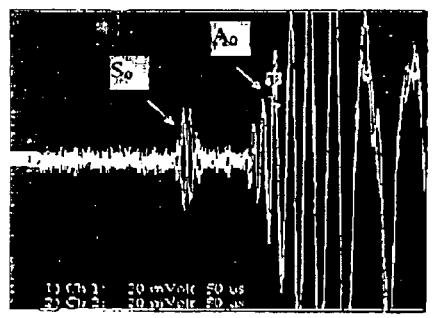
Figure 7C:
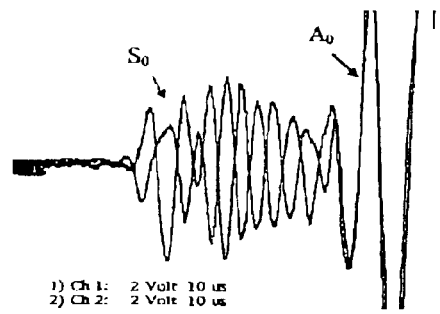
Figure 7B:
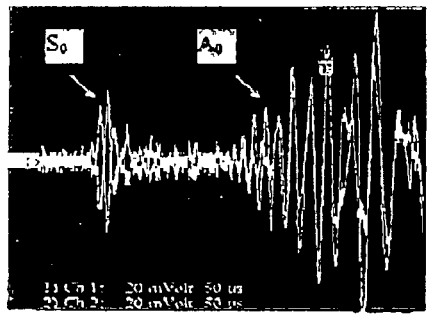

FIGS. 7a and 7b show the signals emanating from the transducers of FIG. 6 in response to an impact 70 cm away (FIG. 7a) and 130 cm away (FIG. 7b), after selective amplification around 100 kHz.

FIG. 7c shows in greater detail the loss of symmetry observed on the modes $S_0$ detected by the transducers PZTb and PZTa of FIG. 6 in the case of a laminated glass consisting of an assemblage of two plates 6 mm thick with a polymer film sandwiched therebetween.

Figure 8:
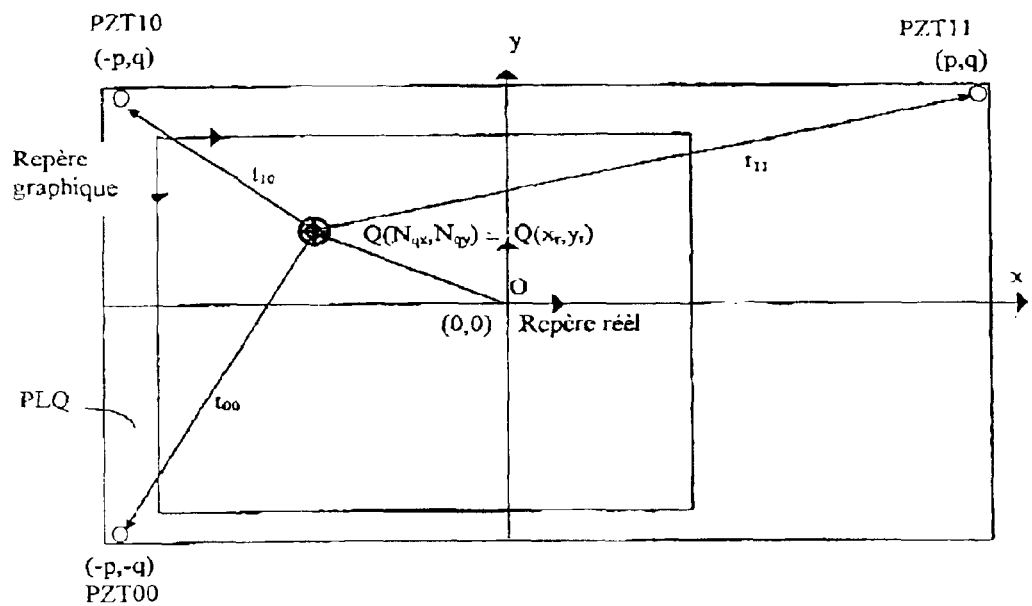

FIG. 8 is a basic diagram of the detection device with three sensors stuck in the corners making it possible to free the sides of the plate.

Figure 9:
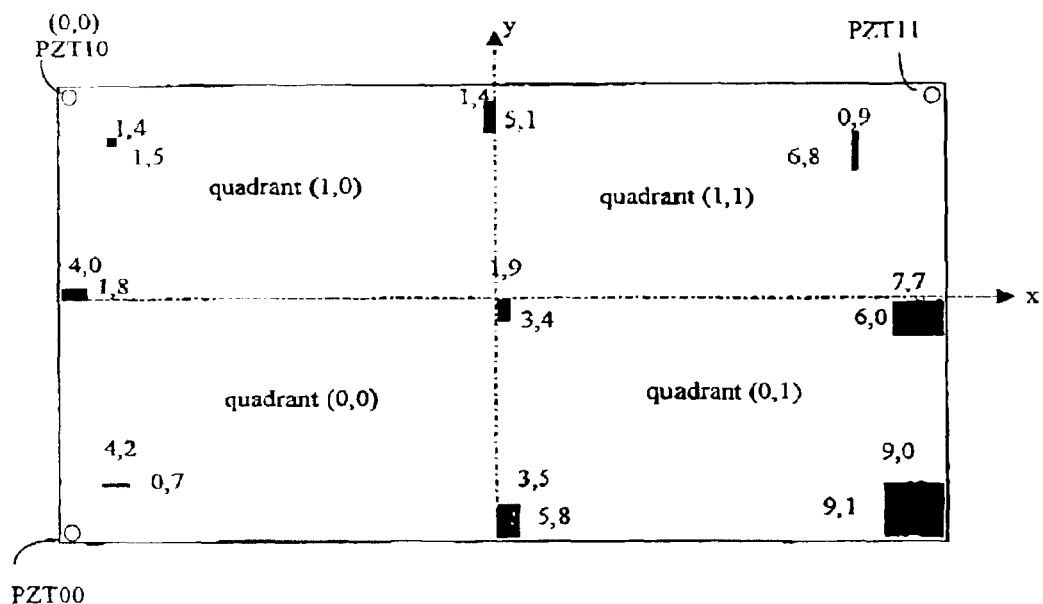

FIG. 9 shows the uncertainty in locating an impact at nine places on the plate of the device of FIG. 8 when the detection of the instant of arrival of the wave packet is known to within 1 μs.

Figure 10:
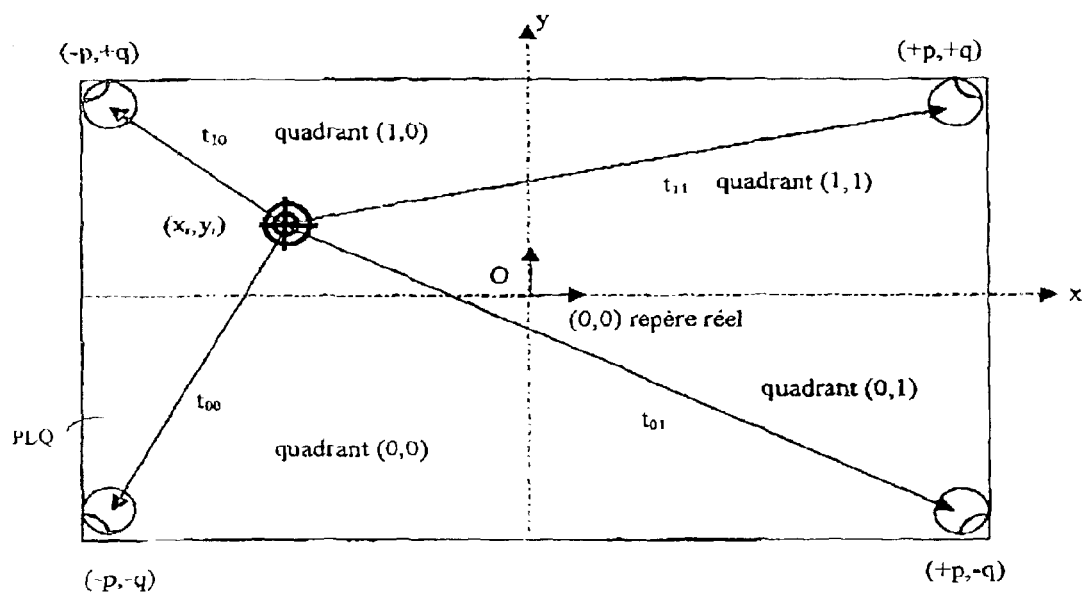

FIG. 10 is a diagrammatic view indicating the times of transit between an impact and the sensors of a detection system with four sensors operating in trios of sensors each functioning on a given quadrant of the plate.

Figure 11:
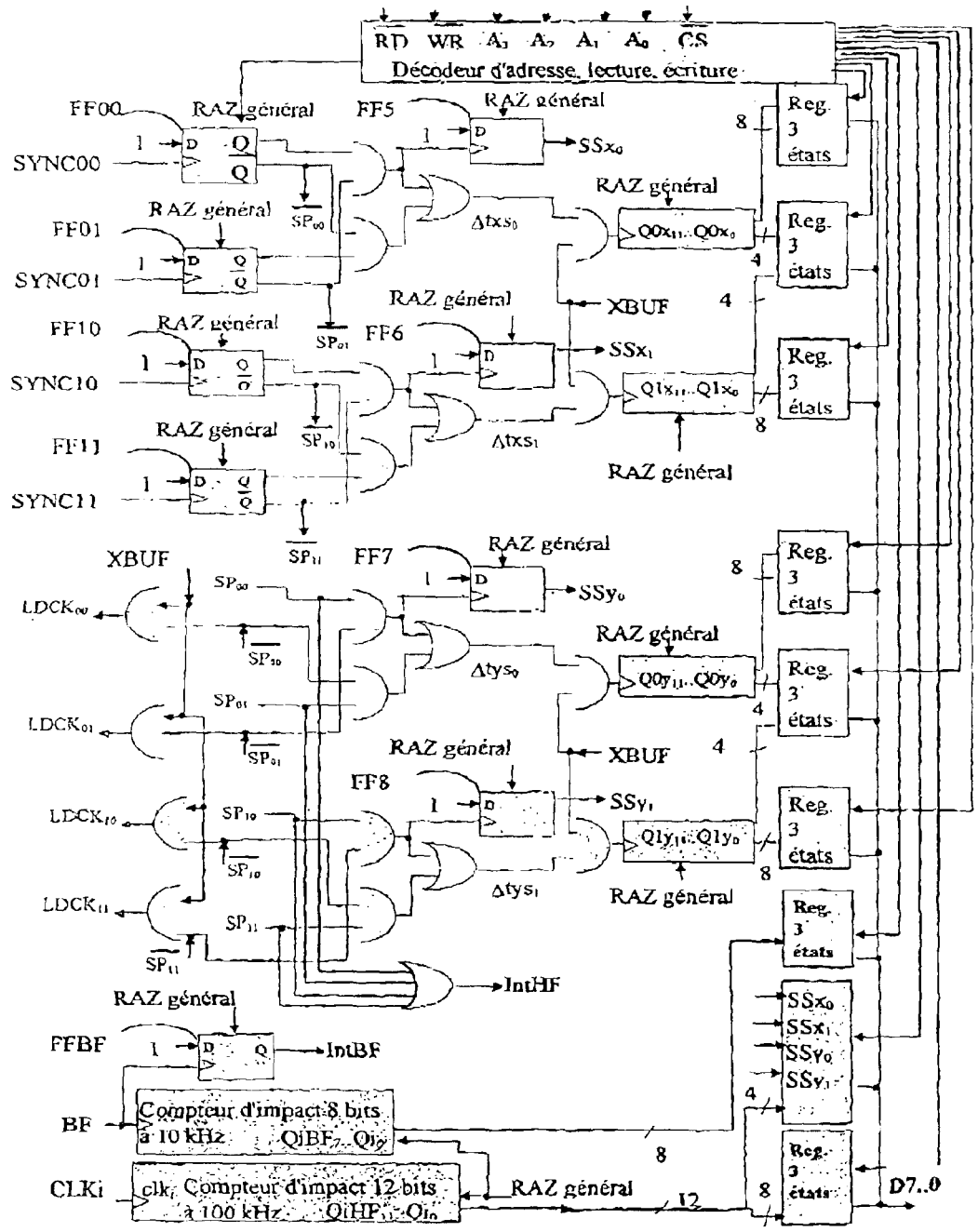

FIG. 11 is a block diagram of a part of the internal architecture of the programmed component "wavepro4" of FIG. 5.

Figure 1:
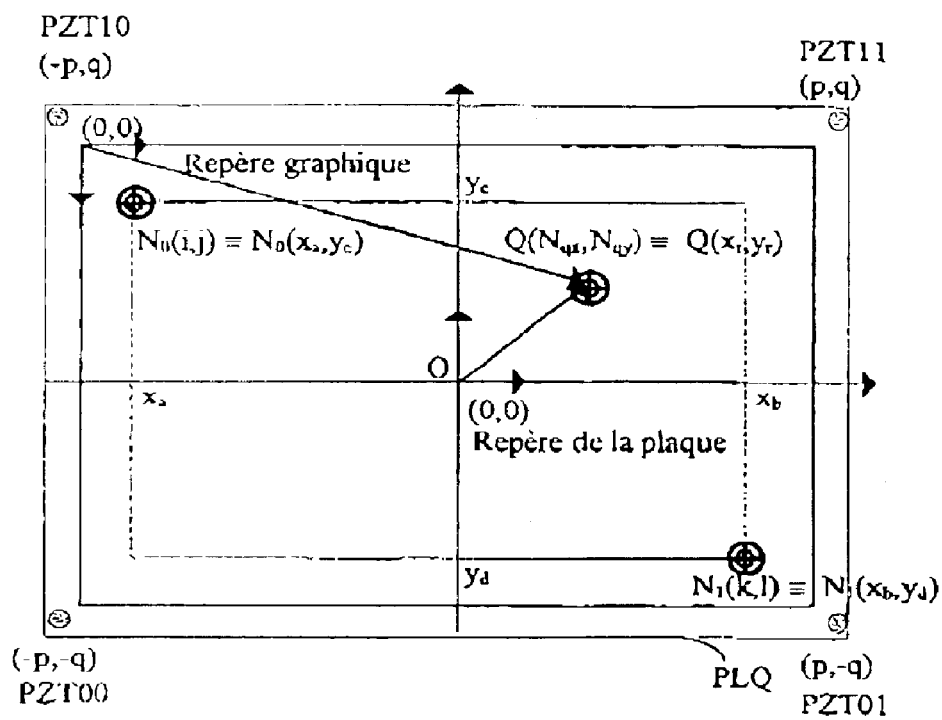

With reference firstly to FIG. 1, represented therein is a plate PLQ comprising four pairs PZT00, PZT10, PZT01, PZT11 of piezoelectric transducers which each constitute an acoustic sensor, the two transducers of each pair being fixed opposite one another on the two opposite faces of the plate for example by sticking in order to gather the acoustic waves traveling around the plate. Unlike the case of the plate described in U.S. Pat. No. 9,816,229, the direction of the electric polarizations and electric connections are respectively symmetric relative to the midplane of the plate and antiparallel or antisymmetric relative to the midplane and parallel in such a way as to discourage any antisymmetric mode of propagation and to favor any symmetric mode of propagation.

An orthogonal reference frame x, y with origin O is associated with the plate PLQ, the center of the plate being able to coincide with the origin O of the reference frame. The four sensors constitute the vertices of a rectangle. The x and y axes cut the middles of the sides. PZT00, PZT10, PZT01, PZT11 have as respective coordinates (−p, −q) and (−p, q), (p, −q), (p, q). The acoustic waves can be generated by the shock of an object on the plate. The plate is an assemblage of at least two isotropic plates each made from a rigid material constituting a good isotropic acoustic conductor around 100 kHz such as glass. The plates are linked together rigidly by a polymer film such as polyvinyl butiral, denoted PVB. The thickness of the polymer film is of the order of 1 to 2 millimeters. Its intrinsic acoustic impedance is small compared with that of the glass so that in this account we shall continue to assume, as a first approximation, that each of the plates constituting the laminated glass is capable of propagating symmetric and antisymmetric Lamb waves. During the propagation in the laminated glass, the modes propagate in a plate and from one plate to another of the lamination. A shock produced at the surface of the laminated glass gives rise in the plates to coupled symmetric modes and also to coupled antisymmetric modes. Given the displacement vectors of matter which characterizes them, the lower the acoustic frequency, the more the antisymmetric modes are attenuated by the PVB as compared with the symmetric modes. FIGS. 7a and 7b clearly show this phenomenon of greater relative attenuation in respect of the antisymmetric modes: depicted therein are the signals gathered independently by the transducers PZTa and PZTb of FIG. 6 after selective amplification at 100 kHz. The signals of FIG. 7a are a response to a shock generated 0.7 m away, while the signals of FIG. 7b are a response to a shock generated 1.3 m away. Although more effectively generated than the symmetric modes, the more dispersive propagation of the antisymmetric modes, combined with the attenuation by the PVB, degrade the head of the antisymmetric wave packets faster. This is why when using laminated glass it is preferable to favor the detection of the symmetric modes.

Furthermore, the applicant has observed that the arrangement of the sensors for the detection of the antisymmetric modes and the rejection of the symmetric modes as described in patents 98/16229 and WO/11378 is unusable with laminated glasses. Specifically, as may be seen in the curves of FIG. 7c obtained via a shock on a laminated glass consisting of two plates of 6 mm glass rigidly bonded by a 2 mm PVB film according to the arrangement of FIG. 6, the $S_0$ modes of the upper and lower plates are no longer in full phase opposition, so that it is no longer possible to discourage the $S_0$ mode effectively regardless of the intensity of the shock, according to the known methods described in the cited patents.

The aim of the present invention is to show how to detect the symmetric modes reliably. To do this, the invention proposes to retain an arrangement with 2 facing transducers according to the symmetric arrangement and the parallel electrical connections of the transducers PZTa and PZTb of FIG. 6, so that this time the discouraging of the antisymmetric modes of larger amplitude near the receivers is ensured. Moreover, it is also necessary to take into consideration the fact that the intensity and the phase of the symmetric modes depend on the angle of impact on the glazing. The waveforms recorded by the receivers are then extremely variable. For the antisymmetric modes, they decrease in amplitude and change shape according to the dispersion curves characterizing the Lamb modes, that is to say the mechanical waves associated with audible frequencies exhibit a smaller phase velocity and smaller group velocity than the mechanical waves associated with higher ultrasound frequencies. The effect of this is to renew the shape of the head of the wave packet, thereby causing ever higher frequency components to appear during propagation. Such is not the case for the symmetric modes whose waveform is preserved since they are almost nondispersive for the ultrasound frequencies considered and the plate thicknesses envisaged.

If we retain the signal processing described in French patent 98/16229 which mentions a broadband amplification followed by a squaring followed by a peak detection and then an integration, it is apparent that this process bases the detection of the instant of arrival of the wave packet on the obtaining of an energy threshold level. Now, the further away the sensor is from the position of the impact, the more it decreases in amplitude, hence implying a longer integration time before attaining this threshold level. This integration time will then depend on the intensity of the shock, as well as on the nature and on the form of the percussive object. This will be manifested at the end of the procedure by an uncertainty in the position of the impact.

To alleviate this drawback, the present invention proposes a modification of the process for detecting the instant of arrival of the wave packet. This modification consists in carrying out a measurement in two steps. The first step is the same as the known method in U.S. Pat. No. 9,816,229, the principle of which has just been recalled. It makes it possible to determine in a first approximation the instant of arrival of a packet and yields synchronization signals for the second step. The second step, which is new, consists, for each sensor, in permanently sampling the signal at the output of the selective amplifier centered on a high ultrasound frequency, around 100 kHz, and in saving the samples in a FIFO (first in/first out) memory of sufficient depth to store the equivalent of 10 acoustic periods. Typically, for a sampling frequency of one million samples per second (1 MSPS) and a central filter frequency of 100 kHz, the depth of the FIFO memory will be 128 samples. The continuous sampling is performed independently for each pair of sensors. The sampling of the signal is stopped by the synchronization signal. The content, then frozen, of the FIFO memory contains a digital recording of the head of the wave packet. Analysis of this content, performed further on in this description, yields the time interval between the synchronization signal and the head of the wave packet making it possible to backtrack, independently of the amplitude or of the phase of the signal, to the instant of arrival of the head of the packet. The accuracy in the measurement of this instant is now imposed only by the sampling frequency, the signal-to-noise ratio and the number of quantization bits.

During the first step, the receiver which is quickest to attain the energy threshold for detecting the 100 kHz component defines the time origin and triggers a counting of the time until the wave packet reaches the other receivers.

This time-stamping of events may possibly be called into question during the second step, in this instance when the difference in propagation times is very small.

The configuration of FIG. 1 is very suitable when one wishes to employ a plate with free edges. However, three pairs of sensors are sufficient to determine the coordinates of an impact. FIG. 8 illustrates this principle of detection with three sensors forming a right-angled triangle. The axes of the physical reference frame as well as its origin remain unchanged as compared with the configuration with four sensors of FIG. 1. Unlike the transducers described in the above patents, the transducers of the present invention have silver-plated lapovers enabling the connections to be made on the same face of the sensor and subsequently enabling a fluid insulating adhesive to be used for sticking. The measurements of the differences in transit times of a wave packet are preferably made in two orthogonal directions. Several configurations with three sensors forming a right-angled triangle can be extracted from the four-sensor configuration of FIG. 1. The four configurations described below lead to identical mathematical solutions, apart from the sign, for the coordinates of an impact $(x_r, y_r)$. Furthermore, each of these configurations is better suited than the others, from the point of view of the accuracy of the measurement, if it is used only on a given quadrant of the plate. To appreciate this, let us take a configuration with three sensors PZT00, PZT10, PZT11 corresponding to the diagram of FIG. 8 and let us look at the uncertainty which is obtained with regard to the position of the impact when the uncertainty in the arrival time of a wave packet is 1 $\mu$s for a wave packet moving at 3350 m/s. FIG. 9 illustrates this uncertainty by solid rectangles whose size, given in millimeters, is displayed at nine different places on a plate of dimensions 1400 mm×800 mm. It is found that the uncertainty in the position of the impact remains less than 7 mm$^2$ in the (1, 0) quadrant while it attains 80 mm$^2$ in the (0, 1) quadrant. It is therefore beneficial to restrict the use of the configuration of FIG. 8 to a single quadrant, the (1, 0) quadrant. However, the same accuracy can be obtained with regard to the other quadrants if the detection trio is changed when the impact changes quadrant.

Thus, for a given impact, we firstly determine the quadrant $(g_y, g_x)$ to which it belongs, then we calculate the coordinates $(x_r, y_r)$ according to the formula associated with this quadrant.

FIG. 10 shows a rectangular plate with four pairs of sensors, with silver-plated lapover, stuck in the corners, the silver-plated lapovers being oriented in such a way that the angular response of the sensors is as uniform as possible over an angular reception span of $\pi/2$. The sensors also form a rectangle and make it possible to define a cartesian reference frame, the center of which is the center of the rectangle formed by the sensors and the axes of which pass through the middle of the sides, in a manner similar to FIG. 1. The cartesian coordinates of the sensors are (−p, −q), (−p, +q), (+p, +q), (+p, −q). The acoustic waves move at the velocity v. The times of propagation up to the sensors of a wave packet generated by an impact at $(x_r, y_r)$ are $t_{00}$, $t_{01}$, $t_{10}$, $t_{11}$.

The coordinates $(x_r, y_r)$ are obtained by solving a system of equations which is valid for a given quadrant. The four systems of equations are:

$$(g_y, g_x).=(0,0).\ x_r<0 \text{ and } y_r<0$$

$$\begin{cases} v(t_{01}-t_{00}) = v\Delta t_{xg} = v\Delta t_{x0} = \sqrt{(x_r-p)^2+(y_r+q)^2} - \sqrt{(x_r+p)^2+(y_r+q)^2} \\ v(t_{10}-t_{00}) = v\Delta t_{yg} = v\Delta t_{y0} = \sqrt{(x_r+p)^2+(y_r-q)^2} - \sqrt{(x_r+p)^2+(y_r+q)^2} \end{cases}$$

$$(g_y, g_x).=(0,1).\ x_r<0 \text{ and } y_r>0$$

$$\begin{cases} v(t_{11}-t_{10}) = v\Delta t_{xg} = v\Delta t_{x1} = \sqrt{(x_r-p)^2+(y_r-q)^2} - \sqrt{(x_r+p)^2+(y_r-q)^2} \\ v(t_{00}-t_{10}) = v\Delta t_{yg} = v\Delta t_{y0} = \sqrt{(x_r+p)^2+(y_r+q)^2} - \sqrt{(x_r+p)^2+(y_r-q)^2} \end{cases}$$

$$(g_y, g_x).=(1,0).\ x_r>0 \text{ and } y_r<0$$

$$\begin{cases} v(t_{00}-t_{01}) = v\Delta t_{xg} = v\Delta t_{x0} = \sqrt{(x_r+p)^2+(y_r+q)^2} - \sqrt{(x_r-p)^2+(y_r+q)^2} \\ v(t_{11}-t_{01}) = v\Delta t_{yg} = v\Delta t_{y1} = \sqrt{(x_r-p)^2+(y_r-q)^2} - \sqrt{(x_r-p)^2+(y_r+q)^2} \end{cases}$$

$(g_y, g_x).=(1,1). x_r>0$ and $y_r>0$ $$\begin{cases} v(t_{10} - t_{11}) = v\Delta t_{xg} = v\Delta t_{xI} = \sqrt{(x_r + p)^2 + (y_r - q)^2} - \sqrt{(x_r - p)^2 + (y_r - q)^2} \\ v(t_{01} - t_{11}) = v\Delta t_{yg} = v\Delta t_{yI} = \sqrt{(x_r - p)^2 + (y_r + q)^2} - \sqrt{(x_r - p)^2 + (y_r - q)^2} \end{cases}$$

The following formulae give the position of the impact $(x_r, y_r)$. It is sufficient to replace $g_x$ and $g_y$ by the value corresponding to the relevant quadrant.

$$X_r = (-1)^{g_x} \frac{\Delta txg \left\{ q\sqrt{p^2v^2(4p^2 - v^2\Delta txg^2)(4p^2 + 4q^2 - v^2(\Delta txg - \Delta tyg)^2)\Delta tyg^2(4q^2 - v^2\Delta tyg^2)} \right\}}{4p\Delta tyg(q^2v^2\Delta txg^2 + p^2(-4q^2 + v^2\Delta tyg^2))} +$$
$$(-1)^{g_x} \frac{\Delta txg p^2 v^2 \Delta tyg^2(-4q^2 + v^2\Delta tyg(-\Delta txg + \Delta tyg))}{4p\Delta tyg(q^2v^2\Delta txg^2 + p^2(-4q^2 + v^2\Delta tyg^2))}$$

$$Y_r = (-1)^{g_y} \frac{qv^2\Delta txg(-4p^2 + v^2\Delta txg(\Delta txg - \Delta tyg))\Delta tyg}{4(q^2v^2\Delta txg^2 + p^2(-4q^2 + v^2Ä tyg^2))} +$$
$$(-1)^{g_y} \frac{\sqrt{p^2v^2(4p^2 - v^2\Delta txg^2)(4p^2 + 4q^2 - v^2(\Delta txg - \Delta tyg)^2)\Delta tyg^2(4q^2 - v^2\Delta tyg^2)}}{4(q^2v^2\Delta txg^2 + p^2(-4q^2 + v^2Ä tyg^2))}$$

Figure 4:
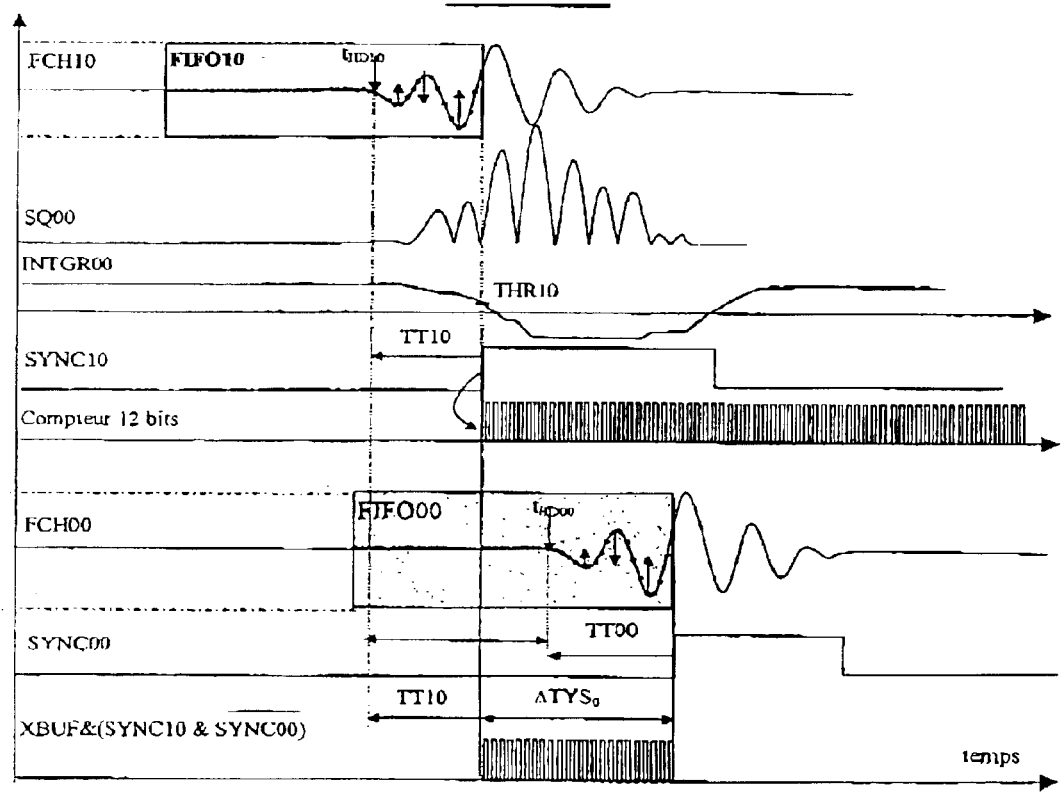
FIG. 4 is a timing diagram of the main steps of measuring the difference in transit times between two sensors.

The determination of the measurement quadrant associated with an impact depends on the differences in flight times between the four sensors. FIG. 4 illustrates the steps of measuring the difference in flight times in the "y" direction on the basis of the sensors PZT00 and PZT10 and the acquisition card described according to the block diagram of FIG. 5. The signals represented are:

the signals output by the selective filters centered on 100 kHz, FCH00 and FCH10, the contents of the memories FIFO10 and FIFO00 at the instant of low/high switching of the synchronization logic signals SYNCH10 and SYNCH00 the signal output by the squarer SQ00 the signal INTGR00 output by the integrator of the pathway associated with PZT00, the synchronization logic signals SYNC10 and SYNC00 output by PMOS00 and PMOS10 the time interval $\Delta tys_0$ separating the synchronization signals the time intervals TT10 and TT00 separating the heads of the wave packets from the respective synchronization signals SYNC10 and SYNC00 a counter of counting frequency identical to the frequency of sampling of the signals and triggered by the logic signal SYNC10

The signals relating to the other two sensors PZT01 and PZT11 are not represented, but yield similar signals on their own acquisition pathway.

In general and with reference to what has just been said, the differences in flight times between the sensors, these differences being given as a number of clock periods XBUF, are determined according to the following formulae and symbols:

, designates a logical "or",

&, designates a logical "and", abs, designates the absolute value,

. designates multiplication,

A bar above a symbol designates the logical inverse. The symbols SP00 to SP11 are the outputs from D-type flip-flops associated with the signals SYNC00 to SYNC11 and switching to the high logic state during a low/high transition of the respective signals SYNC00 to SYNC11.

We have:

$$\begin{cases} \Delta t_{x0} = \text{abs}[TT_{01} - TT_{00} + (-1)^{SS_{x0}} \cdot XBUF \& \Delta txs_0] \\ \Delta txs_0 = ((SP_{01} \& \overline{SP_{00}}) \# (\overline{SP_{01}} \& SP_{00})) \\ \Delta t_{xI} = \text{abs}[TT_{11} - TT_{10} + (-1)^{SS_{xI}} \cdot XBUF \& \Delta txs_1] \\ \Delta txs_1 = ((SP_{11} \& \overline{SP_{10}}) \# (\overline{SP_{11}} \& SP_{10})) \\ SS_{x0} = SP_{00} \& \overline{SP_{01}} \\ SS_{xI} = SP_{10} \& \overline{SP_{11}} \end{cases}$$

$$\begin{cases} \Delta t_{y0} = \text{abs}[TT_{10} - TT_{00} + (-1)^{SS_{y0}} \cdot XBUF \& \Delta tys_0] \\ \Delta tys_0 = ((SP_{10} \& \overline{SP_{00}}) \# (\overline{SP_{01}} \& SP_{00})) \\ \Delta t_{yI} = \text{abs}[TT_{11} - TT_{01} + (-1)^{SS_{yI}} \cdot XBUF \& \Delta tys_1] \\ \Delta tys_1 = ((SP_{11} \& \overline{SP_{01}}) \# (\overline{SP_{11}} \& SP_{01})) \\ SS_{y0} = SP_{00} \& \overline{SP_{10}} \\ SS_{yI} = SP_{01} \& \overline{SP_{11}} \end{cases}$$

$g_x=0$ if $\Delta t_{y0}>\Delta t_{y1}$ and $\lfloor TT_{10}-TT_{00}+(-1)^{SS_{y0}}XBUF\&\Delta tys_0\rfloor<0$ or if $\Delta t_{y1}>\Delta t_{y0}$ and $[TT_{11}-TT_{01}+(-1)^{SS_{y1}}XBUF\&\Delta tys_1]<0$ $g_x=1$ otherwise $g_y=0$ if $\Delta t_{x0}\geq\Delta t_{x1}$ and $\lfloor TT_{01}-TT_{00}+(-1)^{SS_{x0}}XBUF\&\Delta txs_0\rfloor<0$ or if $\Delta t_{x1}\geq\Delta t_{x0}$ and $[TT_{11}-TT_{10}+(-1)^{SS_{x1}}XBUF\&\Delta txs_1]<0$ $g_y=1$ otherwise The memories FIFO10 and FIFO00 each contain a digitization of the head of the wave packet detected by the respective sensors PZT10 and PZT00. The process for determining the coordinates in two steps shows here the improvement which it affords: specifically, with the analog detection system using an active integrator it was not possible to get the precise instant of arrival of the wave packet, simply because it is not possible to know the time which the active integrator takes to switch from a positive saturated state of around +10 V, in the absence of any signal, to a negative saturated state of around −10 volts by integration of the signal. During this transition, the signal drops at a given moment below the switching threshold THR of the PMOS transistor responsible for adapting this transition to logic levels compatible with the CMOS logic, characterized by a supply voltage VCC of possibly 5 volts. The switching threshold of the PMOS transistor is around 1.5 volts below VCC, i.e. 3.5 volts. The transition time TT of the integrator is thus the time of switching from +10 V to +3.5 V triggered by the arrival of the wave packet. This time depends on the amplitude of the envelope of the squared signal SQ, on the gain afforded by the active integrator, and also on characteristics peculiar to the operational amplifier used to make the integrator. Although the integration time can be reduced by increasing the gain of the amplifier and by reducing the positive voltage of the saturated state, this arrangement is confronted with the problem of the compromise that must be found between sensitivity and reliability. Too high a gain might make the integrator switch upon a parasitic signal, while too low a gain causes a loss of accuracy due to an integration time which varies too greatly between a low-intensity impact and a high-intensity impact. By proceeding in two steps according to the present invention, the gain of the integrator is kept high enough to keep good immunity to noise and the integration time corresponding to the interval TT is known. Measurement of the interval TT consists for example in rectifying the digitized signal, then in creating an interpolation curve from the peak amplitudes of the rectified digitized signal. The intersection of the interpolation curve with the time axis corresponding to the output value from the sampler in the absence of any signal yields the origin instant $t_{HD}$ of the packet. Another preferred solution for measuring the interval TT consists in beginning from the synchronization instant situated at an end of the window and in searching for the successive instants of zero-crossing toward the head of the packet. The instants of zero-crossing make it possible to lock onto the period of the digitized signal, while a test on the sum of the amplitudes between the zero-crossings, that is to say per half-period, makes a decision regarding the continuation of the algorithm. When the mean value over a half-period is equal to the output value from the sampler in the absence of any signal, to within a threshold discrepancy, the algorithm is stopped and the mean value is regarded as being the origin instant $t_{HD}$ of the packet.

With reference now to FIG. 5, each sensor is associated with an analog acquisition pathway. The pathways associated with the sensors PZT00, PZT01, PZT11 are equivalent. The analog pathways are characterized by a broadband amplification A1 and A2 followed by a selective amplification FCH in the ultrasound band, followed by a bypass, one pathway of which goes toward an 8-bit analog digital converter CAN with positive measurement span. The positive input voltages are obtained with the aid of a high-pass filtering and of a polarization bridge using the components Ca, Ra, Rb, Rc. The converter is driven by control logic signals CTA originating from a microcontroller μC. The converter CAN supplies the input of a FIFO memory. The memory data are transferred via an 8-bit data bus DATA and other control signals CTF, ordering the loading, the unloading, the resetting to zero of the memory pointers, the placing of the output bus at high impedance, signals for indicating the state of fill of the FIFO memory, into RAM memory of the μC so as to be processed there locally and/or to be transferred there onto another device or a more powerful computer such as a microcomputer via a parallel or serial communication port which may be a USB, MIDI, or RS232 port. The logic levels between the microcontroller and the microcomputer are adapted with the aid of a logic level adapter LGCSHF. The other pathway emanating from the bypass supplies a squaring stage followed by an envelope detection stage followed by an integrator stage supplying a PMOS transistor for adaptation to a CMOS logic level.

The pathway associated with the sensor PZT10 moreover possesses a high-voltage block for switching to emission mode. The high voltage is produced by the module PMP shown explicitly by the diagram of FIG. 5B and comprising a diode pump D21 to D26 and capacitors C21 to C25 supplied by the logic signal XHT whose high logic level is adapted to the +12 V potential with the aid of the transistors T10 and T11 and the low logic level of the −12 V potential with the aid of the transistors T12 and T13. The signal XHT emanates from a logical "and" function between the microcontroller system clock signal XBUF and the signal CGPP activated at the high level when a plate integrity or ultrasound propagation speed measurement test procedure is triggered. Without validation by the signal CGPP the high-voltage module does not produce the high voltage HT of around 70 V. The switching block is managed by the programmed logic component wavepro4 responsible for creating the excitation logic burst and for counting the time of propagation of the acoustic waves between the sensor PZT10 and the other sensors. The programmed logic component wavepro4 is driven by the microcontroller μC. The programmed counters are supplied via the same system clock frequency XBUF as that of the microcontroller. This frequency is also the sampling frequency of the analog digital converters CAN. The burst is obtained with the aid of the logic signals SRC and SNK responsible for ordering the turning on of the switching transistors SWHTC and SWHTK. The transistors CMRC and CMSH are respectively responsible for placing the sensor in reception mode or for short-circuiting the input of the analog amplification pathway so as to protect it from the high voltage.

Part of the internal architecture of the programmed component wavepro4 is described by the block diagram of FIG. 11. The component is furnished with D-type logic flip-flops FF1 to FF4 triggered by the synchronization signals SYNC00 to SYNC11. Logic combinations between the outputs of these flip-flops validate the flip-flops FF5 and FF6 whose outputs are the signals $SSx_0$ and $SSx_1$, while other logic combinations define the logic functions $\Delta txs_0$ and $\Delta txs_1$ representing the time intervals used for the calculation of the difference in flight times between the sensors. A logical "and" function between the clock signal XBUF and the functions $\Delta txs_0$ and $\Delta txs_1$ respectively supply the 12-bit counters ($Q0x_{11} \ldots Q0x_0$) and ($Q1x_{11} \ldots Q1x_0$) associated with 3-state output registers, each register being identified and activated by the decoder of addresses (A3 ... A0). The four high-order bits of the counters ($Q0x_{11} \ldots Q0x_0$) and ($Q1x_{11} \ldots Q1x_0$) share the same output register in the following order high orders on the left: (($Q0x_{11} \ldots Q0x_8$) and ($Q1x_{11} \ldots Q1x_8$)). The logic flip-flops FF1 to FF4 and FF7, FF8 make it possible in the same way to reproduce the logic functions $SSy_0$, $SSy_1$ and $\Delta tys_0$, $\Delta tys_1$, which via a logical "and" with the clock signal XBUF respectively supply the 12-bit counters ($Q0y_{11} \ldots Q0y_0$) and ($Q1y_{11} \ldots Q1y_0$) also associated with 3-state output registers. The four high-order bits of the counters ($Q0y_{11} \ldots Q0y_0$) and ($Q1y_{11} \ldots Q1y_0$) share the same output register in the following order, high orders on the left: (($Q0y_{11} \ldots Q0y_8$) and ($Q1y_{11} \ldots Q1y_8$)).

All the output registers share the same 8-bit data bus DATA. The component also creates the logic functions IntHF and IntBF routed to the output pins of the component wavepro4 and producing when they switch to the high level, an interrupt request detected by the microcontroller μC furnished with inputs provided for this purpose. The function IntBF is created on the basis of the D-type logic flip-flop FFBF. The clock input of the flip-flop originates from a selective amplifier stage FBF centered on 10 kHz or preferably on the upper part of the audible spectrum delivering a signal adapted to the CMOS logic by the transistor NMOS10. The flip-flop FFBF thus validates the presence of spectral energy in the upper part of the audible spectrum. The logic function IntHF is created on the basis of a logical "or" between the Q outputs of the flip-flops FF1 to FF4 validating the presence of spectral energy in the ultrasound band toward 100 kHz. The time interval separating the interrupts IntHF and IntBF characterizes an impact on the plate. Given the lower-frequency spectrum with which it is connected, the interrupt IntBF always occurs after IntHF. When it does not occur or when it occurs after overstepping a waiting time, the measurement is denied since it may have been caused by an untimely ultrasound signal being propagated to the plate via the floor. The $\overline{Q}$ outputs of the logic flip-flops FF1 to FF4 are routed by way of a logical AND with the signal XBUF to the output pins of the component wavepro4 and form the respective clock signals LDCK00, LDCK01, LDCK10, LDCK11 of the memories FIFO00 to FIFO11. The FIFO memories are thus frozen at the instant of switching of the signals SYNCij, with i and j equal to 0 or 1.

The quantization of the intensity of the impact is carried out by diverting the output signal from a high-frequency selective amplifier, that is to say around 100 kHz, for example that of FCH00 to a 12-bit impact counter programmed in the component wavepro4 whose clock input CLKi is the signal FCH00 adapted to the CMOS logic.

The microcontroller is preferably one with RISC architecture. Its system clock XBUF is a multiple of the frequency 32768 Hz of the quartz QRTZ. The microcontroller is furnished with counters/timers, with several input/output ports operating with and without interrupt, with RAM random access memory, with PROM read only or EPROM electrically programmable read only memory or with reprogrammable FLASH-type memory, with means of in situ programming of the program code of JTAG type, and with means of serial communication to other devices. It is endowed with at least four capture/compare functions for date-stamping the temporal events. The synchronization signals SYNC00, SYNC01, SYNC10, SYNC11 are in particular connected to the capture/compare ports. The microcontroller is furnished with an arithmetic and logic unit allowing it to calculate the cartesian coordinates of the impact, and to quantize the intensity of the impact. This solution is envisaged when the intensity information and position information relating to the impact have to be transmitted rapidly. In particular, it is possible to use the acoustic plate as a piano or a two-dimensional percussion instrument. A key then corresponds to a sound or an elementary audiovisual event executed in a predefined manner, when a given portion of the plate is struck with a greater or lesser intensity. In applications of this type, one seeks a fast response time, typically less than 10 milliseconds. The acoustic plate is of smaller dimensions, of the order of 0.25 m². The microcontroller is then responsible for all the processing and for communicating the information $(x_r, y_r,$ impact counters) via the MIDI interface defined for digital musical instruments.

According to another aspect which can be considered independently or otherwise of the aspects alluded to above, the invention proposes to improve the ergonomics and the comfort of use of the glazing by dealing with the problem of the sound nuisance caused by the impact of an object on the plate according to a process for masking the sound generated by the impact, with a synthesized sound triggered by IntHF. Specifically, the synchronization signals switch at the start of the audible sound generated by the percussion. This may therefore be advantageously exploited in order to trigger a recording followed by a processing and by a real-time sound synthesis which will be superimposed on the noise of the impact and which will be able to enrich its frequency content in such a way as to imitate a known sound, such as for example the noise of a percussion instrument, of an animal or of a natural event or to produce a sound which is simply different from the sound generated by the impact. In certain regions of space the amplitude of the synthesized sound will be able to oppose that of the sound produced by the impact in such a way as to reduce the intensity of the noise. It is possible by choice to condition the emission of the synthesized sound to the presence of the interrupt IntBF occurring in practice less than 1 millisecond after IntHF.

As has been said, the system according to the invention comprises a computer which receives the signals emanating from the electrical processing circuits. The computer can, as a function of these signals, emulate the operation of certain peripherals such as for example a pointer of mouse type or a keyboard. When the acoustic plate is associated with a screen of large dimensions such as a plasma screen or a video projector projecting the graphical interface onto the surface of the acoustic plate, a homothetic correspondence can be established between the screen coordinates in pixels and the physical coordinates in millimeters of any impact in such a way that a graphical pointer appears on the screen opposite the impact. This correspondence must be establishable given that the relative positions of the video projector and of the plate can change accidentally. For that purpose, the invention proposes a procedure for calibrating the interface which is simple and fast. The procedure is carried out in five steps with reference to FIGS. 2-b, 2-c, 2-d, 2-e and 2-f. The operator makes sure beforehand and by orienting his video projector as required that the axes of the graphical and physical cartesian reference frames are colinear. The calibration procedure proper can then commence. FIG. 2-b is a screen for presenting the procedure. The operator must produce an impact on the plate in order to go to the step illustrated in FIG. 2-c. During this second step, a target appears on the screen. The screen coordinates $N_0(i, j)$ of the target are known and close to the origin of the screen coordinates. The shock on the plate opposite the target provides the software with the corresponding cartesian physical coordinates $N_0(x_a, y_c)$. We then go to step 3 with FIG. 2-d. A second target appears with known screen coordinates $N_1(k, l)$ close to the maximum coordinates of the screen. Here again the operator is requested to make an impact on the plate opposite the target so that the calibration software determines the corresponding cartesian physical coordinates $N_1(x_b, y_d)$. The software is then furnished with sufficient information to determine the screen coordinates $(N_{qx}, N_{qy})$ of any other impact from its physical coordinates $(x_r, y_r)$ according to the following correspondence formula:

$$\begin{cases} N_{qx} = i + (k-i)\dfrac{(x_r - x_a)}{(x_b - x_a)} \\ N_{qy} = j + (l-j)\dfrac{(y_r - y_d)}{(y_c - y_d)} \end{cases}$$

It remains to verify that the calibration is satisfactory. This is the aim of step 4 illustrated by FIG. 2-*e:* a target appears in the middle of the screen, for example with screen coordinates (400, 300) for a screen displaying with a maximum SVGA resolution of (800, 600). Here again the operator is requested to make an impact opposite the target, this leading to step 5 illustrated by FIG. 2-*f.* A dialog window appears displaying on one side the expected screen coordinates ATX and ATY, that is to say (400, 300), and on the other the screen coordinates RESX and RESY deduced from the above correspondence formula. When the discrepancy oversteps a certain threshold, in practice by about 10 pixels, it is recommended that the procedure be recommenced.

Once the homothetic correspondence between the plate and the graphical screen has been established, any impact at a given place on the plate, situated opposite the screen can be visualized on the screen via a graphical pointer. A software driver is then able to contrive matters such that these impacts are interpreted as events of another pointing peripheral, such as for example a peripheral of mouse type. An impact on the plate will thus be interpreted as a mouse click or double click at the place with the screen coordinates of the impact.

If these coordinates correspond to the location of an icon associated with the execution of a program, the latter will be executed.

The impacts may be interpreted as events associated with other peripherals, in particular of keyboard type. This is very useful when navigating around the Internet network and when wishing to communicate information requiring the input of alphanumeric characters.

Figure 3:
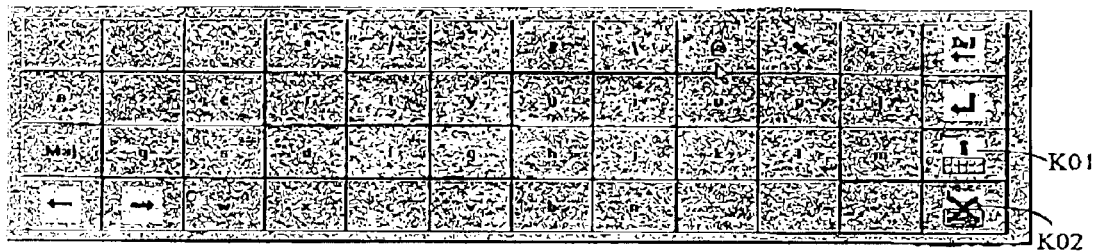
FIG. 3a is a screen capture of the main keys of an alphanumeric keyboard occupying almost the entire width of the graphical screen and almost ⅓ of its height. The keyboard is enriched with two supplementary keys making it possible to move it or to reduce its size to two floating keys according to FIG. 3b.
Figure 3:

Accordingly, the invention provides a floating and ever-accessible menu bar represented in FIG. 3-B. This bar is disposed in a corner of the screen. It contains a limited number of icons so as to mask the least possible graphical area. However, if despite this minimum footprint, the bar were to mask a background document, the bar can be moved to another corner of the screen indicated by the icon K03 representing a menu bar associated with an arrow indicating the corner in which the floating menu bar will be found during the next impact on this icon. Successive impacts on this icon will have the effect of moving the bar into the four corners of the screen, the movement to another corner being effected in the counterclockwise direction.

The second visible icon K04 in FIG. 3-B represents a keyboard. An impact performed opposite this icon triggers the appearance of the alphanumeric keyboard of FIG. 3-A. In order to maximize the area occupied by the keys, so that the associating of an impact with a key is reliable without however covering the entire area of the screen, the keyboard contains a restricted number of alphanumeric keys according to a configurable format, of the French AZERTY type or American QWERTY type.

The keyboard occupies the entire width of the screen, but only a third of its height. Here again, a supplementary key K01 is provided for moving the keyboard upward or downward should it mask the document of interest situated in the background. The key represents a keyboard with an arrow above or below depending on whether the keyboard is in the bottom or top part of the screen respectively.

Another aspect of the invention relates to the addition of a functionality making it possible to limit the portion of the plate on which the impacts emulate the events of the mouse-type graphical pointer (click; double click etc.). Specifically, in a public arena it is desirable to limit the field of action of somewhat unscrupulous users. In particular, the functionality is aimed at preventing a user from quitting a software application by clicking in the closure icons or in the drop-down menus. For this purpose it is sufficient to define a zone of the screen authorizing the interpretation of impacts as events of the mouse peripheral. An impact performed outside the authorized zone will optionally trigger the displaying of a message. The message can take the form of a graphical window whose contours delimit the authorized zone.

Figure 2A:
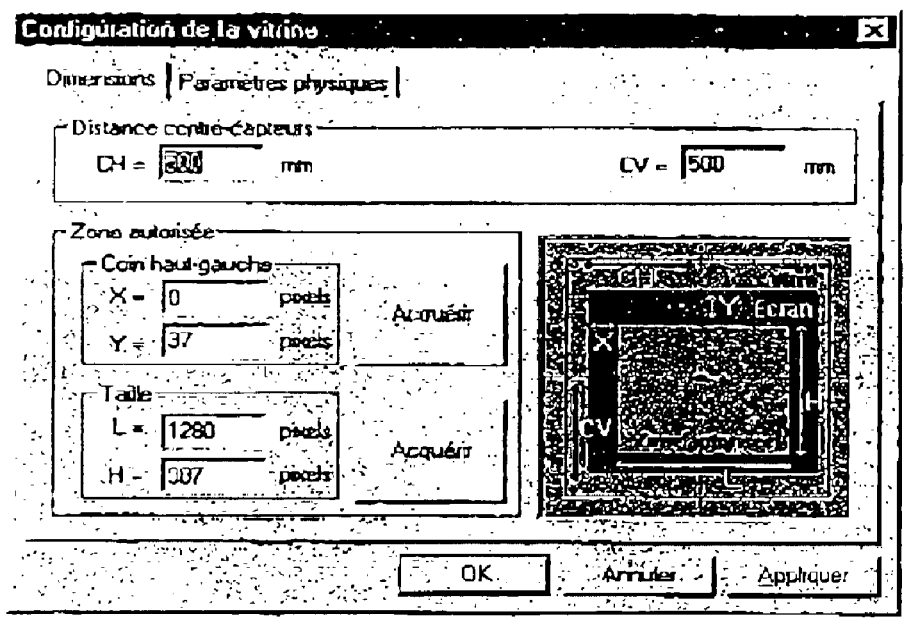
Figure 2B:
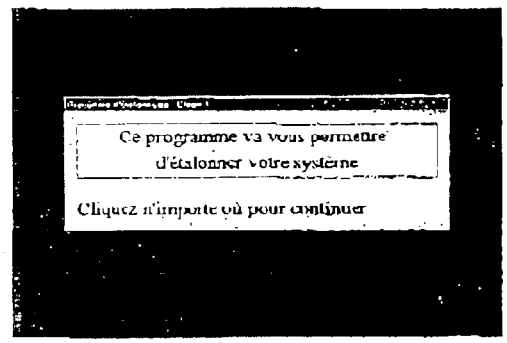
Figure 2C:
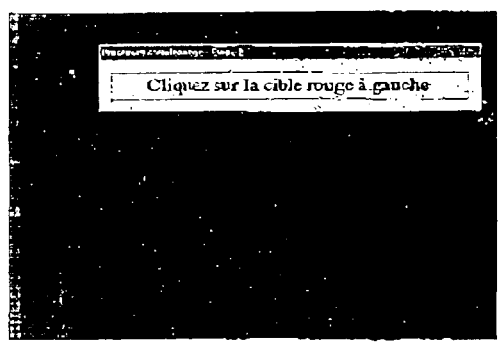
Figure 2D:
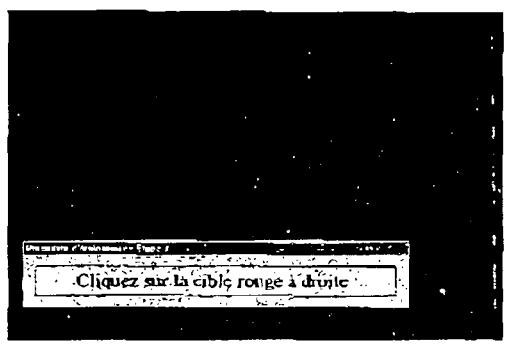
Figure 2E:
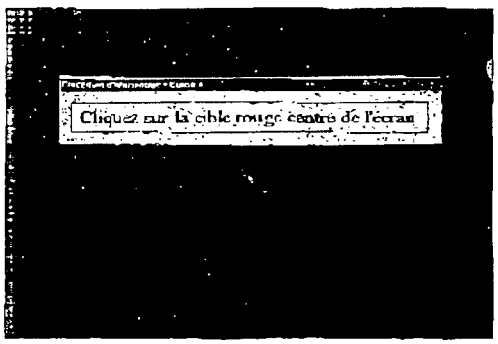
Figure 2F:
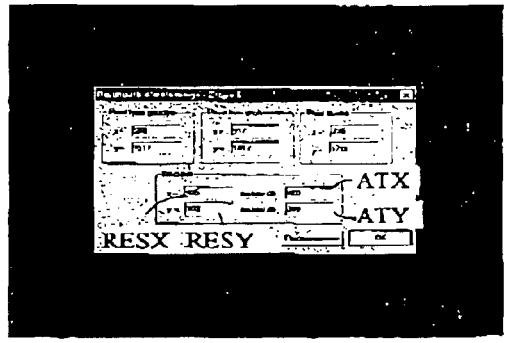

The procedure for defining the authorized zone is illustrated in FIG. 2*a.* It shows a dialog window. The authorized zone is defined either by directly inputting the screen coordinates (X, Y) of the upper left corner, followed by the datum giving the width L and height H of the zone in pixels, or by direct acquisition of these data by successively activating the "acquire" keys and by performing the acoustic impacts in the corresponding upper left and lower right corners of the zone to be defined. The impacts are thereafter converted into screen coordinates, from which are extracted the data which are displayed in the fields provided for direct entry of the values.

This dialog window also contains a diagrammatic image of the plate making it possible to configure the acquisition of the coordinates. The symbols p and q defining the cartesian coordinates of the sensors throughout this description are replaced in the figure by the symbols CH and CV respectively.

What is claimed is:

1. A device for acquiring the position coordinates of a source of mechanical waves generated by an impact on the surface of a plate (PLQ) of finite dimensions comprising a set of acoustic sensors (PZT00 to PZT11) each formed of a pair of piezoelectric transducers (PZTa, PZTb) situated facing one another on either side of the plate, the device comprising processing means for determining the coordinates of the source by analyzing the difference in propagation times of the acoustic waves generated by the source to the various sensors, a device characterized in that, the processing means comprise in association with each sensor (PZT00 to PZT11) a respective electronic circuit comprising in cascade, means for digitizing the amplified signal around a predetermined frequency, and associated with means for limiting the digitization to a time window starting before the acoustic waves reach a sensor and ending after the acoustic waves have reached said sensor.

2. The device as claimed in claim 1, characterized in that the sensors are four in number and the piezoelectric transducers of each sensor are disks or wafers of piezoelectric ceramics stuck to either side of the plate, in such a way that the four sensors form on the plate the vertices of a rectangle whose center (O) constitutes the origin of the coordinates of a cartesian reference frame whose x and y axes are parallel to at least two sides of the rectangle defined by the four sensors.

3. The device as claimed in claim 1, characterized in that the determination of the position coordinates is achieved via a trio of sensors taken from among the four sensors, said trio corresponding to the three sensors nearest to the source, each trio being responsible for detecting the coordinates in a given quadrant of the cartesian reference frame defined by the sensors.

4. The device as claimed in claim 3, characterized in that the locating of a point of interaction of the source with the plate consists in extracting the ultrasound frequency component in the vicinity of 100 kHz generated by the impact of a hard object such as a fingernail, a metal key, a ballpoint pen, a hard plastic in the form of a rod and in determining the largest of the differences in absolute value of the times of flight between two sensors of two first pairs (PZT00, PZT01) identified by gx=0 or (PZT10, PZT11) identified by gx=1, on the one hand, and two pairs of two sensors (PZT00, PZT10) identified by gy=0 and (PZT01, PZT11) identified by gy=1, on the other hand, so that the cartesian coordinates of the point of impact (xr, yr) on the plate are given by the formula:

$$X_r = (-1)^{gx} \frac{\Delta txg\left\{q\sqrt{p^2v^2(4p^2 - v^2\Delta txg^2)(4p^2 + 4q^2 - v^2(\Delta txg - \Delta tyg)^2)\Delta tyg^2(4q^2 - v^2\Delta tyg^2)}\right\}}{4p\Delta tyg(q^2v^2\Delta txg^2 + p^2(-4q^2 + v^2\Delta tyg^2))} +$$

$$(-1)^{gx} \frac{\Delta txg p^2v^2\Delta tyg^2(-4q^2 + v^2\Delta tyg(-\Delta txg + \Delta tyg))}{4p\Delta tyg(q^2v^2\Delta txg^2 + p^2(-4q^2 + v^2\Delta tyg^2))}$$

$$Y_r = (-1)^{gy} \frac{qv^2\Delta txg(-4p^2 + v^2\Delta txg(\Delta txg - \Delta tyg))\Delta tyg}{4(q^2v^2\Delta txg^2 + p^2(-4q^2 + v^2\ddot{A}tyg^2))} +$$

$$(-1)^{gy} \frac{\sqrt{p^2v^2(4p^2 - v^2\Delta txg^2)(4p^2 + 4q^2 - v^2(\Delta txg - \Delta tyg)^2)\Delta tyg^2(4q^2 - v^2\Delta tyg^2)}}{4(q^2v^2\Delta txg^2 + p^2(-4q^2 + v^2\ddot{A}tyg^2))}$$

or p and q designate the position of the sensors with respect to the center O of the rectangle, v, the velocity of the plate mode selected by the particular arrangement of the pair of transducers forming a sensor, $\Delta txg$, (respectively $\Delta tyg$) the difference in the propagation times of the wave packet generated by the impact between the sensors of one of the two first pairs (respectively of one of the next two pairs), selected by the value of the index gx (respectively gy) equaling 0 if the coordinate yr (respectively xr) is negative and 0 otherwise and being written $\Delta tx_0$ if gx=0 or $\Delta tx_1$ if gx=1 (respectively $\Delta ty_0$ if gy=0 or $\Delta ty_1$ if gy=1).

5. The device as claimed in claim 1, characterized in that said electronic circuits associated with the sensors PZTij (i or j equaling 0 or 1) comprise in cascade two broadband preamplifier stages (A1ij, A2ij), a selective amplifier stage FCHij centered on a frequency of around 100 kHz, a squaring stage (SQij), a peak detector stage (ENVLij), and an integrator stage (INTGRij), a stage PMOSij for adaptation to a logic level yielding a synchronizing signal SYNCij, said synchronization signal SYNCij triggering, via a logic transition, a flip-flop FFij responsible for ordering the stoppage of the analog digital converter CANij and the transferring into memory FIFOij (first in-first out) of the digitized value of the signal emanating from the selective filter FCHij diverted to the converter CANij.

6. The device as claimed in claim 1, characterized in that the processing means comprise downstream of said electronic circuits associated with the respective sensors a programmable logic module (wavepro4) driven by a microcontroller $\mu C$ of an arithmetic and logic unit, of input/output ports operating on an interrupt basis, of RAM random access memory, of ROM type program memory, of a real-time clock, of ports for capturing the instants of switching of the signals SYNCij, of communication ports, of data buses and of address buses.

7. The device as claimed in claim 6, characterized in that the microcontroller $\mu C$ is furnished with software means for measuring the time interval TTij separating the head of a wave packet $t_{HDij}$ from the rising edge of the synchronization signal SYNCij, said software means consisting in determining the instants of zero-crossing of the digitized signal on the basis of the end of the digitization window commencing on the rising edge of SYNCij, while a test of decrease on the successive sum values of the amplitudes between the zero-crossings, that is to say a test on the mean value of the signal per half-period, makes a decision regarding the continuation of the search algorithm for the instant $t_{HDij}$. When the mean value over a half-period is equal to the output value from the sampler in the absence of any signal, to within a threshold discrepancy, the algorithm is stopped, and the mean value is regarded as being the origin instant $t_{HDij}$ of the packet.

8. The device as claimed in claim 4, characterized in that the values of the bits gx and gy are determined by the following formulae:

$$\begin{cases} \Delta t_{x0} = \text{abs}[TT_{01} - TT_{00} + (-1)^{SS_{x0}} \cdot XBUF \& \Delta txs_0] \\ \Delta txs_0 = ((SP_{01} \& \overline{SP_{00}})\#(\overline{SP_{01}} \& SP_{00})) \\ \Delta t_{x1} = \text{abs}[TT_{11} - TT_{10} + (-1)^{SS_{x1}} \cdot XBUF \& \Delta txs_1] \\ \Delta txs_1 = ((SP_{11} \& \overline{SP_{10}})\#(\overline{SP_{11}} \& SP_{10})) \\ SS_{x0} = SP_{00} \& \overline{SP_{01}} \\ SS_{x1} = SP_{10} \& \overline{SP_{11}} \end{cases}$$

$$\begin{cases} \Delta t_{y0} = \text{abs}[TT_{10} - TT_{00} + (-1)^{SS_{y0}} \cdot XBUF \& \Delta tys_0] \\ \Delta tys_0 = ((SP_{10} \& \overline{SP_{00}})\#(\overline{SP_{10}} \& SP_{00})) \\ \Delta t_{y1} = \text{abs}[TT_{11} - TT_{01} + (-1)^{SS_{y1}} \cdot XBUF \& \Delta tys_1] \\ \Delta tys_1 = ((SP_{11} \& \overline{SP_{01}})\#(\overline{SP_{11}} \& SP_{01})) \\ SS_{y0} = SP_{00} \& \overline{SP_{10}} \\ SS_{y1} = SP_{01} \& \overline{SP_{11}} \end{cases}$$

$g_x=0$ if $\Delta t_{y0} > \Delta t_{y1}$ and $[TT_{10}-TT_{00}+(-1)^{SS_{y0}}XBUF\&\Delta tys_0]<0$ or if $\Delta t_{y1} > \Delta t_{y0}$ and $[TT_{11}-TT_{01}+(-1)^{SS_{y1}}XBUF\&\Delta tys_1]<0$ $g_x=1$ otherwise $g_y=0$ if $\Delta t_{x0} \geq \Delta t_{x1}$ and $[TT_{01}-TT_{00}+(-1)^{SS_{x0}}XBUF\&\Delta txs_0]<0$ or if $\Delta t_{x1} \geq \Delta t_{x0}$ and $[TT_{11}-TT_{10}+(-1)^{SS_{x1}}XBUF\&\Delta txs_1]<0$ $g_y=1$ otherwise 9. The device as claimed in claim 1, characterized in that the acoustic plate is a laminated glass consisting of an assemblage of plates of like thickness, stuck together by a polymer film.

10. The device as claimed in claim 1, characterized in that the piezoelectric transducers of a sensor are ferroelectric ceramics whose polarization vectors are oriented symmetrically with respect to the thickness of the plate and whose electrical connections are in parallel.

11. The device as claimed in claim 1, characterized in that the piezoelectric transducers of a sensor are ferroelectric ceramics whose polarization vectors are oriented antisymmetrically with respect to the thickness of the plate and whose electrical connections are in antiparallel.

12. The device as claimed in claim 1, characterized in that the piezoelectric ceramics are disks or plates whose lower electrode, in contact with the plate, is brought to a small upper face portion, while remaining insulated from the upper electrode by an electrical insulating guard strip.

13. The device as claimed in claim 1, characterized in that one of the sensors for example PZT10 is able to be switched into an emitter of an ultrasound wave packet so as to trigger a measurement of velocity of propagation of the acoustic waves in at least two different directions given by the positions of the other sensors.

14. The device as claimed in claim 1, constituting a peripheral interface with a computer fitted with a screen.

15. The device as claimed in claim 14, characterized in that the acoustic plate also serves as a display screen for visualization by scattering of projected light, either by frosting at least one of the faces of the glass plates, or by using a translucent polymer film, optionally colored and optionally combined with an effect of light concentration by means of a Fresnel lens.

16. The device as claimed in claim 14, characterized in that the axes of the screen reference frame and of the acoustic plate are colinear.

17. The device as claimed in claim 14, characterized in that a homothetic correspondence between a pixel $(N_{qx}, N_{qy})$ of the screen reference frame and a physical point $(x_r, y_r)$ of the plate opposite the graphical pixel is established by automated calibration according to the following operations:
   displaying by the software of a target at various positions with known screen coordinates and measuring of the corresponding physical coordinates.

18. The device as claimed in claim 1, characterized in that the acoustic plate constitutes a graphical pointing peripheral capable of emulating another pointing peripheral such as for example a peripheral of mouse type, an impact on the plate at a given position then being interpreted according to a particular coding, as a click or a double click carried out on the corresponding screen coordinates and triggering the execution of programs associated with an icon situated opposite the impact.

19. The device as claimed in claim 8, characterized in that the zone of emulation of the mouse events (click, double click, etc.) is limited to an authorized portion of the screen zone exhibiting the form of a rectangle defined by the X, Y coordinates in pixels of one of its corners as well as its width L and its height H in pixels, it being possible for these values to be entered directly at the keyboard or to be deduced by acquiring the coordinates of the impacts in the corners of the authorized zone to be defined.

20. The device as claimed in claim 18, characterized in that it is furnished with software means making it possible to produce a floating toolbar, permanently accessible, consisting of several icons K03, K04 ensuring when they are struck by an impact:
   the appearance (K04) on the screen of an alphanumeric keyboard, two of whose keys K01 and K02 make provision respectively for its upward movement and its reduction to the floating menu bar,
   the fast and circular movement (K03) of the toolbar into one of the four corners of the screen, designated by the direction of the arrow represented on the icon.

21. The device as claimed in claim 1, characterized in that it is furnished with software means such that the portion of the plate which does not serve as a screen is also interactive and is configured as an extension of the screen zone.

22. The device as claimed in claim 1, characterized in that it is furnished with software means such that the portion of the plate which serves as a screen is regarded as a special zone making it possible to quit or to switch from any software application managing the execution of groups of programs associated with various zones of the plate which are situated off-screen.

23. The device as claimed in claim 14, characterized in that it is furnished with software means such as client/server type protocols allowing the graphical interface to be connected, via a modem or a network card, to an Internet access provider.

24. The device as claimed in claim 14, characterized in that it contains software means making it possible to update the multimedia content (picture, sound, video) available on the host computer of the graphical interface from a remote computer.

25. The device as claimed in claim 14, characterized in that the electronic circuits associated with the respective sensors PZTij comprise downstream of said broadband amplification means A2ij a bypass to means of frequency enrichment of the audible acoustic signal generated by the impact on the plate, as well as means for reconverting the enriched signal into an analog signal and sending it to loudspeakers so as to mask the nuisance caused by the impact in the form of a different sound reproducing for example the noise of a percussion instrument within a symphonic composition, or the noise of an animal or of a natural event, said means of enrichment being implemented at the very instant IntHF at which the first of the four synchronization signals SYNCij switches logic level.

26. The device as claimed in claim 14, characterized in that the acoustic plate constitutes a graphical pointing peripheral capable of emulating another pointing peripheral such as for example a peripheral of mouse type, an impact on the plate at a given position then being interpreted according to a particular coding, as a click or a double click carried out on the corresponding screen coordinates and triggering the execution of programs associated with an icon situated opposite the impact.

27. The device as claimed in claim 26, characterized in that the zone of emulation of the mouse events (click, double click, etc.) is limited to an authorized portion of the screen zone exhibiting the form of a rectangle defined by the X, Y coordinates in pixels of one of its corners as well as its width L and its height H in pixels, it being possible for these values to be entered directly at the keyboard or to be deduced by acquiring the coordinates of the impacts in the corners of the authorized zone to be defined.

28. The device as claimed in claim 26, characterized in that it is furnished with software means making it possible to produce a floating toolbar, permanently accessible, consisting of several icons K03, K04 ensuring when they are struck by an impact:
   the appearance (K04) on the screen of an alphanumeric keyboard, two of whose keys K01 and K02 make provision respectively for its upward movement and its reduction to the floating menu bar,
   the fast and circular movement (K03) of the toolbar into one of the four corners of the screen, designated by the direction of the arrow represented on the icon.

29. The device as claimed in claim 14, characterized in that it is furnished with software means such that the portion of the plate which does not serve as a screen is also interactive and is configured as an extension of the screen zone.

30. The device as claimed in claim 14, characterized in that it is furnished with software means such that the portion of the plate which serves as a screen is regarded as a special zone making it possible to quit or to switch from any software application managing the execution of groups of programs associated with various zones of the plate which are situated off-screen.

31. The device as claimed in claim 5, characterized in that the electronic circuits associated with the respective sensors PZTij comprise downstream of said broadband amplification means A2*ij* a bypass to means of frequency enrichment of the audible acoustic signal generated by the impact on the plate, as well as means for reconverting the enriched signal into an analog signal and sending it to loudspeakers so as to mask the nuisance caused by the impact in the form of a different sound reproducing for example the noise of a percussion instrument within a symphonic composition, or the noise of an animal or of a natural event, said means of enrichment being implemented at the very instant IntHF at which the first of the four synchronization signals SYNCij switches logic level.

* * * * *

UNITED STATES PATENT AND TRADEMARK OFFICE
CERTIFICATE OF CORRECTION

PATENT NO. : 6,933,930 B2 Page 1 of 1
APPLICATION NO. : 10/070333
DATED : August 23, 2005
INVENTOR(S) : Devige et al.

It is certified that error appears in the above-identified patent and that said Letters Patent is hereby corrected as shown below:

In Item [57], the abstract, Line 6, please delete "plate, the" and insert -- plate. The --.

In Item [57], the abstract, Line 10, before "a respective" please insert -- provides --.

In Item [57], the abstract, Line 13, please delete "associated with" and insert -- and --.

Column 21, line 45, please delete "8" and insert -- 18 --.

Column 22, line 19, please delete "14" and insert -- 1 --.

Signed and Sealed this

Twenty-seventh Day of March, 2007

JON W. DUDAS
*Director of the United States Patent and Trademark Office*